United States Patent [19]

Graf

[11] 4,131,706
[45] Dec. 26, 1978

[54] SUNLIGHT ADMITTING HEAT IMPEDING PANEL

[76] Inventor: Ronald E. Graf, Rte. 3, Box 520, Crozet, Va. 22932

[21] Appl. No.: 752,982

[22] Filed: Dec. 21, 1976

Related U.S. Application Data

[63] Continuation-in-part of Ser. No. 643,842, Dec. 3, 1975, abandoned.

[51] Int. Cl.$^2$ .......................... B32B 3/12; B32B 3/00
[52] U.S. Cl. ........................................ 428/116; 65/36; 156/197; 264/164; 428/119; 428/178
[58] Field of Search .................. 428/72, 73, 116–120, 428/178; 156/197; 264/41, 164, 261, 275, 346; 65/33, 36, 66

[56] References Cited

U.S. PATENT DOCUMENTS

| | | | |
|---|---|---|---|
| 3,507,737 | 4/1970 | Busdieker et al. | 428/116 |
| 3,679,384 | 7/1972 | Colson et al. | 428/116 |
| 3,790,654 | 2/1974 | Bagley | 428/116 |
| 3,903,341 | 9/1975 | Gerhold | 428/116 |
| 3,919,379 | 11/1975 | Smarook | 428/119 |

*Primary Examiner*—George F. Lesmes
*Assistant Examiner*—P. Thibodeau

[57] ABSTRACT

A process with minor variations for producing a configuration of glass and/or any similar material such as plastic or epoxy is disclosed. The configuration is basically a honeycomb of pipes of transparent material attached to a transparent plate, such as window glass. The pipes are closed at one end by the plate. Then pipes prevent convection movement of a fluid parallel to the plate near its surface, except for very short distances. The unique inventive feature of the process lies in the fact that the honeycomb of pipes are produced simultaneously by a drawing process, during which either a part of a plate, which part is in the form of a grid, is softened, or a grid of new soft material is added to a plate, and the pipes are always attached to the plate both during formation and upon completion of formation.

Also disclosed is a special configuration to render the pipes resistant to breakage under thermal stress. This special configuration for the honeycomb design can be applied equally well in other areas such as ceramic catalytic converters, heat exchangers, and thermoelectric air conditioners.

4 Claims, 10 Drawing Figures

SUNLIGHT ADMITTING HEAT IMPEDING PANEL

This application is a continuation-in-part of Ser. No. 643,842, filed on Dec. 3, 1975, and now abandoned.

BACKGROUND OF THE INVENTION

In the search for solar heating means with high operating temperatures, it has been known for some time, that a honeycomb structure of a material which acts as a black body to heat radiation will be a good thermal barrier against heat travelling along the honeycomb cavities, provided that the heat path is long compared to the transverse dimensions of the cavities. This assumes no net fluid flow is present in the direction of heat flow along the cavities. Geometry will almost eliminate and certainly mitigate the effects of convection currents. Honeycombs of metal foil have been constructed, which admit most of the light incident within 40 degrees of the honeycomb axes, while acting as a reasonable heat barrier, because of a coating of material transparent to sunlight but almost black to heat radiation. It has been proposed by some to use aluminized mylar as the material of the honeycomb. Labor to produce the structure is relatively high. Another problem with an aluminized mylar honeycomb is that a significant amount of sunlight is absorbed by the structure, especially at large angles. Also it is open to the atmosphere, and rain can enter the structure. Wind can also blow cold air and dust in and out. Thus, glass plates must enclose the honeycomb in most areas. The cost of the glass structure is additional. Furthermore, the glass will reflect some incident light causing a further loss of power. The most desirable configuration would be a glass honeycomb attached to a glass plate, but this up to now has been difficult and expensive to produce by present techniques of producing the honeycomb and plate separately for later joining.

A BRIEF SUMMARY AND OBJECTIVES OF THE INVENTION

One object of the present invention is to show how a structure which will conduct through itself a very high percentage of any sunlight incident upon it at any but a glancing angle, while acting as an effective barrier to low temperature radiation can be made inexpensively. Another object is to show how to produce a heat-impeding, light-admitting structure having as one component a plate, so that the structure can be installed as easily as a pane of window glass; and further, so that the structure will act as a fluid barrier. Another object is to show how to produce, in at least one form of the invention, a weather resistant structure incorporating a novel honeycomb design which can also withstand temperatures above 600 degrees centigrade on one side, while having normal Earth surface temperatures on the other side. The fulfillment of these and other objectives will be obvious from the following description.

One process of the present invention, stated simply, could start with a plate of glass in the annealing stage. A network of baits is lowered to contact the glass surface, heated slightly, and allowed to sink into the glass surface, thus forming a glass melt at the network. The baits are then cooled and drawn upward. As the baits rise, they draw ribbons of glass rising from the plate but attached thereto. The baits are then severed from the ribbons and can be reused on another plate. What is produced is a honeycomb of glass pipes formed by the ribbons and attached to the glass plate. Each ribbon represents a surface for at least two pipes except for those ribbons at the edge of the plate. The pipes are attached to the glass plate in such a way that each pipe is closed at one end by the plate and would thus hold water like a cup if oriented properly with respect to gravity.

A novel cross-section of the honeycomb structure most resistant to thermal breakage is also described. The signal feature of this special cross-section is that all sides ending at any and all particular junctures spiral out from the juncture in the same rotation sense if viewed from a good distance along any juncture extended. This configuration causes all sides to rotate the same way in the neighborhood of any junctures under compression and to rotate the opposite way in the neighborhood of any juncture under tension.

BRIEF DESCRIPTION OF THE DRAWINGS

FIG. 1b is a top view of the plate and the full attached honeycomb structure of which only part is shown in FIG. 1a.

DETAILED DESCRIPTION OF THE INVENTION

Figure 1A:
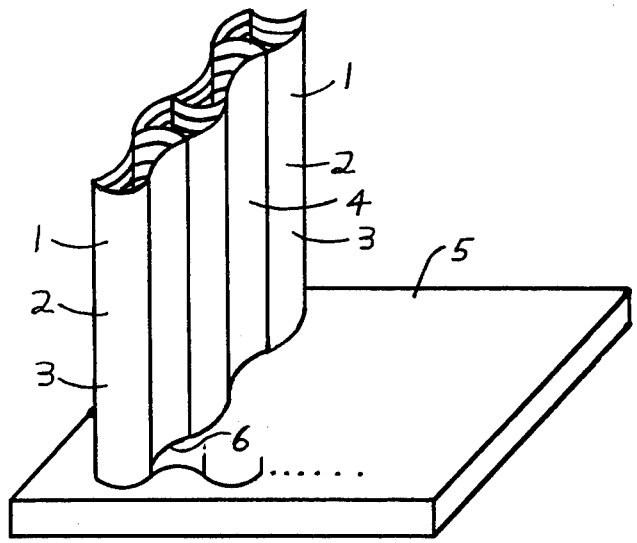
FIG. 1a is a perspective view of a plate and part of an attached honeycomb structure.
Figure 1B:
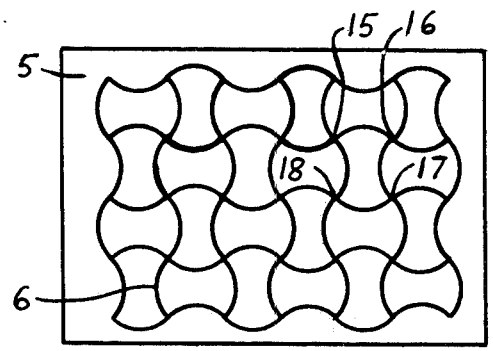

One product of the present process invention is shown in perspective view of FIG. 1a and in top view in FIG. 1b. For clarity and to prevent a clutter of lines, most of the pipes comprising the honeycomb have not been shown in FIG. 1a. Refering now to FIG. 1a, pipes 4 are attached to plate 5 at junctions 6. The numerals 1, 2, and 3 refer to levels at various distances from the average surface of plate 5. During operation as a sunlight admitter and heat barrier, sunlight entering plate 5 from the side opposite the honeycomb will travel from plate 5 toward level 1 and eventually will exit from among the ends of the pipes away from the plate. Of course, light could be incident upon the honeycomb side and exit from the plate side. Also the pipes are not light pipes but pipes in the usual sense of a fluid carrier. After the sunlight exits from the pipes, heat will be produced by the light in a medium beyond the ends of the pipes. Heat waves will be emitted by said medium, back toward the pipes and plate. The walls of the pipes will absorb and reemit many of these waves back toward the absorber. The complete working of a honeycomb of material which absorbs low temperature heat radiation is described in solar literature. Computer programs assuming reemissions, conduction, and convection are available. Therefore, only improvements in structure, materials, and manufacture will be explained.

The points of the pipe walls at level 1 will be hotter than the points at level 2 which in turn will be hotter than the points on the pipe walls at level 3 and so on down to the plate. Thus, thermal gradient will cause expansion to be greatest on level 1, less at level 2, and still less at level 3, and least at the plate, which structurally is most prone to break under thermal stress. Due to thermal gradient, some levels will experience compression, while others may experience tension. Expansion produces an opposing compression. In any case, the walls of the pipes will bend; and the curvature of the walls, as seen in a top view of the same configuration, FIG. 1b, will become more pronounced for levels under compression. This bending to more pronounced curvature will cause a clockwise rotation at intersection 16 of FIG. 1b, and a countercloskwise rotation at intersection 15 of FIG. 1b. Similarly, the curvature of walls will decrease for levels under tension, thus causing a counterclockwise rotation at intersection 16 of FIG. 1b and a clockwise rotation for intersection 15. Since, in the depicted configuration, all sides meeting at a particular intersection cooperate to cause rotation in the same direction, there is little stress at the intersection. Thus the probability of cracking is small. The pipe walls should be made thin and flexible to bend without breaking under stress. Straight walls would suffice in many applications and might be easier to produce, but for high stress applications precurved walls will hold up better.

Figure 2:
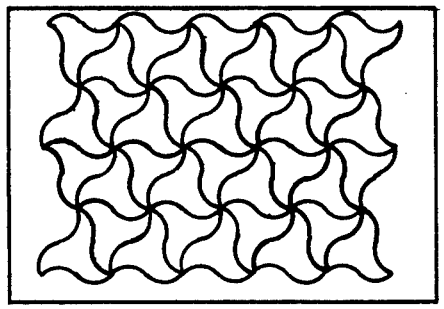
FIG. 2 is a top view of a plate and a new honeycomb structure.

The wall configuration shown in FIG. 1b is already described in the prior art; however, the wall configuration in FIG. 2 has never been described before and will be generalized and claimed as a configuration of honeycomb structure apart from the process of manufacture described herein. The view in FIG. 2 is the same perspective as used in FIG. 1b. In this case, compression parallel to the plane of the plate will cause counterclockwise rotation at all pipe wall intersections. Similarly, tension will cause clockwise rotation.

Of course, FIG. 1b and FIG. 2 will become blurred under the action of a thermal gradient; but the curved walls in a cross-section at any particular level away from the average surface of the plate will look similar to the curved lines in the figures. Also, during manufacture it is not necessary that the curvature be the same at all levels. It would also be allowable to incline the pipes at any reasonable angle with respect to the plate normal. This might be advisable in some cases to minimize convections currents. Other designs for the shape of pipe walls when the pipe walls are thought of as a component, should also be considered within the scope of the process described in this invention, including a triangular or a hexagonal arrangement.

The plate and the pipes could be made of glass or of any suitable transparent material. The whole structure need not be made of the same material. The plate may be mounted on any suitable Sun heat collecting structure or on a greenhouse to prevent heat escape in the winter. The mounting is almost as easy as if pipes were not there, assuming that the pipes are absent at the border of the plate.

If the configuration is made of glass, then the edges of the pipe walls opposite to the plate should be rounded and without significant flaws, because glass cracks easily at a flawed point. Special procedures may be necessary to keep the edge thin during rounding and flaw removal, as will be discussed under the heading "Methods of Manufacture." Also, the surface of the glass plate should have smooth curvature, especially near the pipes, to maintain strength against cracking under thermal stress or under normal wind loads. Some annealing may be necessary unless the drawing of the pipes is done with consideration given to the final strength of the plate. This too will be discussed under "Methods of Manufacture."

METHODS OF MANUFACTURE

Figure 3:
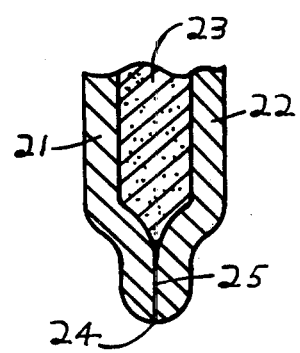
FIG. 3 is an enlargement of a cross-section of a part of a bait which can be warmed or cooled and used to pull glass or other substances from a pool.
Figure 4:
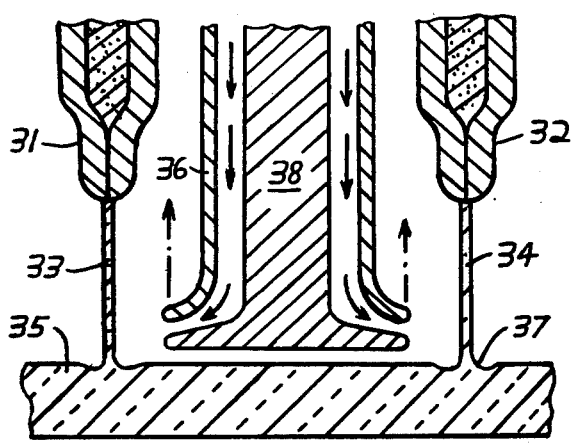
FIG. 4 shows a cross-section of two parts of a bait working to pull ribbons of glass. The air blower, also shown, is used to cool or heat the ribbons at selected levels and to maintain the curvature of the ribbons as they cool or harden.

The following descriptions of possible manufacturing methods is not meant to include all possible methods, and further, should not act to restrict the description of configuration in this patent. Also, all methods to be described will have a certain novel aspect in common. The first method to be described requires softening portions of a glass plate by localized heating, the rest of said plate being near the annealing temperature. A bait is then used to pull the pipe walls from the softened pools of glass on the surface of the plate. The bait contacts the glass on the plate in a pattern such as that shown for the pipe walls in FIG. 1b. In one particular embodiment, a perspective view of a portion of the bait would appear as in FIG. 6 and a cross-section of a part of the bait would appear as in FIG. 3, viewed along one of the pipe walls, and in a viewing direction parallel to the glass plate. Metal 21 and metal 22 are joined at juncture 25. Electrical insulator 23 keeps the metals from contacting except at juncture 25. The tip 24 can have its temperature raised or lowered from ambient by the thermoelectric effect. Its temperature can be raised before pulling, to soften the glass and produce a melt near the tip of the bait, and later lowered to harden the glass during pulling. FIG. 4 shows a cross-section of two parts of the bait 31 and 32 pulling, from the surface of plate 35, ribbons of glass 33 and 34, which remain attached to glass plate 35. Deformed cylinder 36 and valve 38, comprising the blower, cooperate to train cooling fluid onto the ribbons 33 and 34, to cool them below a temperature of easy flow. Other blowers also cooperate to maintain the curvature of the glass during cooling or solidifying, acting similarly to fluid bearings. The same fluid effect is used to curve glass plates by the glass industry. Further, the blowers serve to increase the pressure in the pipe system, thus preventing collapse due to glass surface tension. Without the extra pressure, there would be unbalanced surface tension forces at the border, tending to pull in the borders of the honeycomb. The ribbon 34 is drawn from a glass melt pool 37 on the surface of plate 35.

During operation, bait parts 31 and 32 are lowered onto glass plate 35, said plate being sufficiently cool to retain its general shape. The bait parts are heated until a pool of melted glass appears around the bait parts, said melted glass being originally part of the glass plate. Extra glass could, but need not, be added and might even have a different chemical composition or a different melting point. Next the bait is cooled at the tips and drawn away from the plate, drawing ribbons of glass behind it. Fluid, possibly air and shown by arrows in FIG. 4, is used to cool, solidify, and maintain the general curvature of the glass ribbons, as they are drawn from the melt. The indentation at 37, if smooth and not too deep, will not seriously affect the strength of the glass plate. After the ribbons 33 and 34, etc., are pulled far enough, so that the resulting pipes are a few times longer than they are wide, the ribbons must be severed from the bait. This may be done by heating the bait and pulling much faster. It might be best to train a thin stream of hot fluid on the boundary to be severed, again using the blowers. This would produce a thinner edge at the severing border, especially if the fluid stream is directed partially away from the glass plate. Notice that cylinder 36 and valve 38, of FIG. 4, would move up to do the hot fluid stream severing. After severing, the fluid stream should gradually be cooled and slowed, as the glass edge solidifies. It would also be possible to remove jagged edges or edges with large radii by dipping the edges in an acid bath after severing from the baits. It might be best to first dip the edges in a protective coating, such as wax. The acid would then sever and round just beyond the protective border. Various tempering methods may also be employed.

Another method of manufacture, similar to the first, would involve extruding or pulling the pipe wall substance through an interconnected maze of slits. The slits would move similarly to the bait in the previous method. The temperature of the slits and substance, the rate of pulling, the slit width and slit material, and the composition of the substance pulled would determine the thickness of the ribbon pulled from the slits, neglecting edge effects. The substance could be glass, epoxy, or any suitable substance which hardens to transparency and which could be made to stick to the plate, possible by roughening the plate surface temporarily. Slit width need not be uniform.

Figure 5:
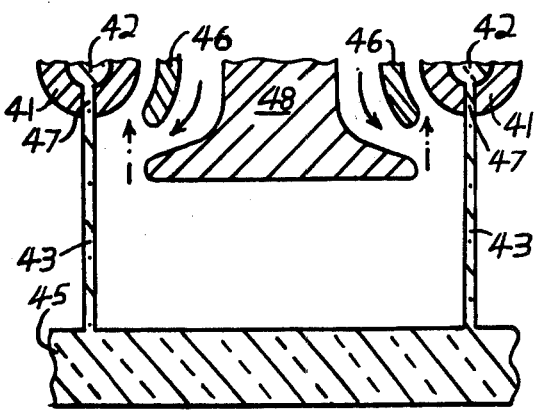
FIG. 5 shows a cross-section of two slits in a bait fed by cavities 42 used to form ribbons 43 on plate 45 with the coooperation of a fluid blower.
Figure 7:
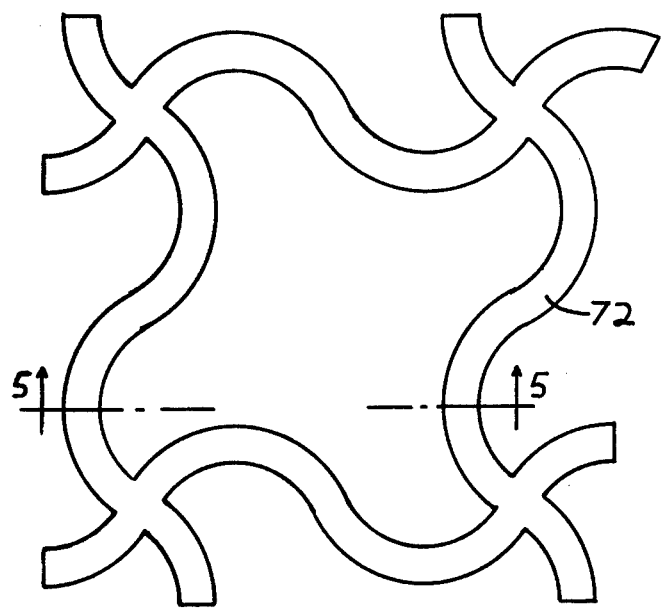
FIG. 7 shows a plan view of a bait, fed in the same manner as an array of pipes, and containing slits not shown at its lower edges from which honeycomb material may eminate.
Figure 9:
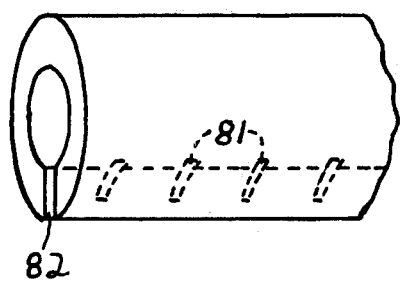
FIG. 9 shows baffles in the slits to facilitate radial extrusion of honeycomb substance from the slits.
Figure 8:
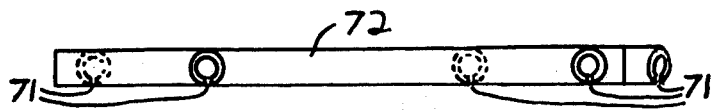
FIG. 8 shows an elevation view of the bait of FIG. 7.

FIG. 8 shows an elevation view of the bait of FIG. 7, showing slits 71 along the lower part of the bait. FIG. 7 shows a plan view of a bait 72. FIG. 9 shows baffles 81 which could be used in slit 82 or in slits 71 in order to extrude substance with a reduced velocity component along the slit. If the baffles taper down as they approach the slit exit and stop before the exit, then the substance exiting will reunite and form a continuous wall. FIG. 5 shows parts 41 as a partial cross-section of the bait shown in FIG. 7, and indicated therein by the number 5, together with the cross-section of materials being processed, and accessory machinery.

Refering to FIG. 5 for a more detailed description of the bait and its operation, and assuming the substance is glass, ribbons 43 are extruded or pulled from pipe-like containers 41 through slits 47 from reservoirs 42. The containers, slits, and reservoirs may all be considered connected in the sense that the bait may be made from one or more interconnected mazes of slit piping. The pulling is preceded by touching containers 41 to plate 45. After glass through slits 47 begins to fuse with plate 45, the containers 41 are moved away from plate 45 at a predetermined rate. Deformed surface of revolution 46 and valve 48 cooperate to produce a fluid stream to cool and solidify ribbons 43, as they are being pulled from slits 47. The fluid streams also aid in maintaining ribbon shape and in preventing collaspe of the honeycomb of ribbons, due to surface tension. After the pulling is complete, valve 48 can be brought closer to surface 46 and hotter fluid can be forced in the direction of the arrows, to cause softening and severing of the glass, thus severing the containers 41 from the ribbons 43. Of course, the finishing processes can be similar to those of method 1. During the entire process of adding the pipe honeycomb structure to plate 45, the plate should be kept near but below the highest possible temperature at which it will maintain its rigidity and basic integity. If a substance other than glass is used for the pipe walls, severing of the slits from the ribbons might be effected by a very rapid fluid stream or by sudden rapid pulling of the slits accompanied by reduced substance pressure in the slits.

The bait may be made up of other then circular pipes. For instance, strips of metal forming two sides of the slit and the mainly vertical sides of a pipe may be attached to a plate above in a spaced relationship so that two strips and a strip portion of the plate form a slit pipe. For example, the bait in FIG. 6 could be modified by adding a flat plate above, removing the dielectric indicated by 23 and spreading the metals to form a slit along 25.

Figure 6:
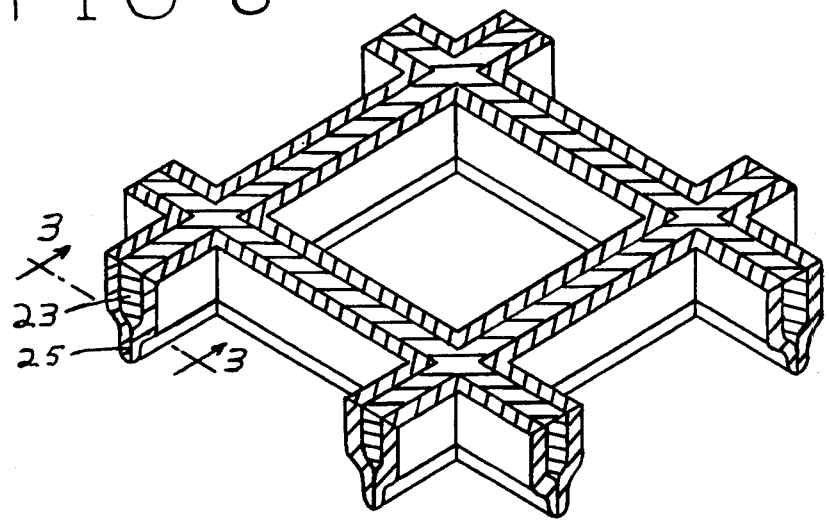
FIG. 6 shows a part of a bait whose lower edges can be cooled or heated.

A third method of manufacture, similar to the first, would involve replacing the baits with a grid of wires or metal ribbons similar in shape to the dielectric grid 23 in FIG. 6. These would be lowered to the glass plate surface, heated electrically to produce glass pools, and then drawn upward to form the pipe walls from the drawn glass ribbons. The process temperature might be somewhat lower than for method 1, but the glass ribbons could still be fluid cooled. Depending on the quality desired in the final product, fluid cooling may not be necessary in any of the above methods.

One method of manufacture might be more appropriate with one set of substances; whereas, another might be more appropriate under different conditions. For instance, glass needs heating and cooling; whereas, epoxy does not. Thus, the second method, without heating and cooling, might be appropriate to produce a transparent cement-type honeycomb on a plate. The methods are meant only to be suggestive, but not all inclusive. All the described methods of manufacture have one thing in common, however. In each case the honeycomb structure or formed parts thereof never exist separately from the plate. A separate plate and honeycomb never have to be produced separately and joined at a later time. This elimination of a separate step, of combining honeycomb and plate, imparts efficiency to my process. Thus, one object becomes a combination of two rather than two or more objects becoming one. This fact together with the actual processing operations is the main insight of the invention.

There is an invention by another inventor which produces a fused plate and honeycomb combination by softening the whole plate before pulling; but I believe that process produces a weaker product, and that process is not adaptable to operation during glass plate manufacture.

The other insight concerns the rotation aspects of the honeycomb at the juncture of walls under compression or tension. As long as all the walls meeting at any particular juncture spiral outward with the same rotation sense, clockwise or counterclockwise, and arc for a sufficient angle before reversing curvature, then the honeycomb will resist thermal breakage. The spiral may, of course, be approximated by a series of straight, i.e. flat sides, an extreme example of which would be one zig and one zag between junctures.

The structure whose process of manufacture is described in this disclosure in its best form has the following good qualities, among others. It can be manufactured in a few simple steps. It can be installed like a pane of glass, will admit as much light as a pane of glass, and will withstand weather ravages, such as wind, rain, and hail, as well as a pane of glass will. Further, it will act as a heat barrier far superior to a pane of glass, while having a weight similar to that of a pane of glass. It will also resist cracking, which is due to thermal gradients, being able to support a temperature difference between faces of roughly one thousand degrees Kelvin. Of course, the statements in this paragraph refer to one particular version of the structure; and there can be a wide range of materials, weight, strength, and quality in other versions.

What is claimed is:

1. A solid structure with a multiplicity of substantially parallel cells in a honeycomb type of configuration which can deform to accommodate compression and tensile forces due to temperature gradients within the structure, said structure being comprised of interconnecting walls between juncture lines of the walls, the walls being thin enough to be thought of as geometrical surfaces, each juncture line being substantially straight and parallel to every other juncture line, so that the juncture lines may be thought of as straight and parallel, each wall being curved and oriented with respect to the other walls in a recurring symmetrical pattern, with at most one wall running between any pair of juncture lines, each of said cells being comprised of walls each undulating in and out with respect to the interior of the cell, so that any wall in a cell is substantially represented by a single undulating curve when viewed parallel to any juncture line of two walls, and such that each particular wall in turn going around any cell in one direction is first convex with respect to the cell after leaving a juncture line, and last concave with respect to the cell upon approaching the juncture line between the particular wall and the next wall around the cell, and equivalently such that all walls ending at any and all particular junctures spiral out from the juncture in the same rotation sense if viewed from a good distance along any juncture extended, this configuration thus, in the absence of other rotation factors, causing all the walls to physically rotate in the neighborhood of any juncture in a given rotation sense around the juncture whenever the juncture is under increasing compression, said compression being substantially applied perpendicular to the juncture at all points along the juncture.

2. The solid structure as in claim 1 wherein each of said substantially parallel cells has three walls and each wall is substantially the same as any other wall in the structure except for a number of rotations of 120 degrees about a juncture between walls and a translation of position preserving orientation.

3. The solid structure of claim 1 wherein each of said substantially parallel cells has four walls and each wall is substantially the same as any other wall in the structure except for a number of rotations of 90 degrees about a juncture between walls and a translation of position preserving orientation.

4. The solid structure as in claim 1 wherein each wall is shaped substantially like a figure S in a view taken parallel to any of said juncture lines of the walls.

* * * * *